A. DEAN.
DRIVING MECHANISM FOR WAVE MOTORS.
APPLICATION FILED OCT. 29, 1910.
998,756.
Patented July 25, 1911.
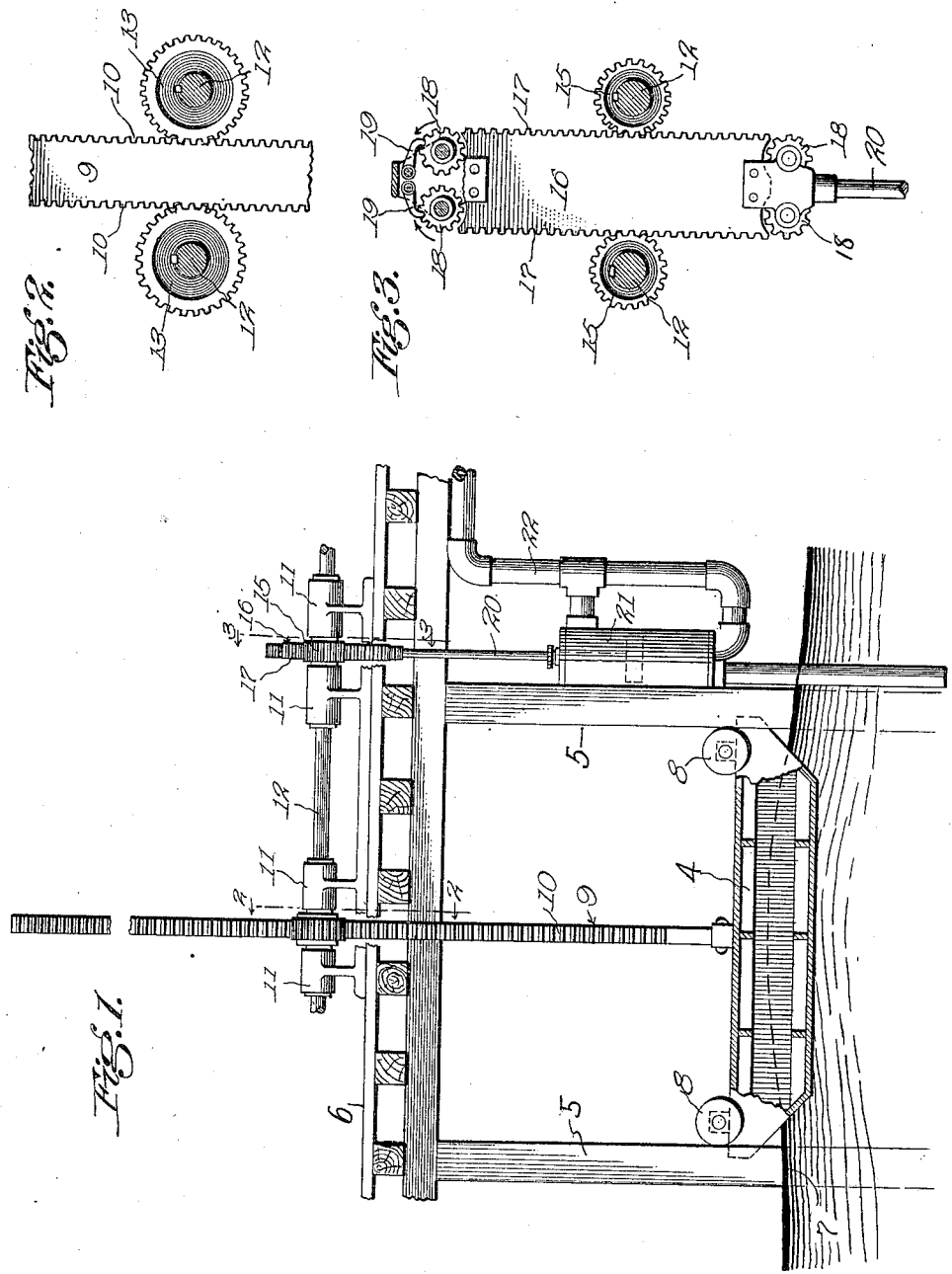

UNITED STATES PATENT OFFICE.

ALEXANDER DEAN, OF LOS ANGELES, CALIFORNIA.

DRIVING MECHANISM FOR WAVE-MOTORS.

998,756.  Specification of Letters Patent.  Patented July 25, 1911.

Application filed October 29, 1910.  Serial No. 589,714.

*To all whom it may concern:*

Be it known that I, ALEXANDER DEAN, a citizen of the United States, residing at Los Angeles, in the county of Los Angeles and State of California, have invented new and useful Improvements in Driving Mechanisms for Wave-Motors and the Like, of which the following is a specification.

This invention relates to a wave motor adapted to utilize the vertical movement of a water wave. It is well known that the vertical movement carries with it a large majority of the wave energy—that the horizontal movement concerns only a very small amount of water on the wave surface and carries with it a very small portion of the total energy. My wave motor is intended to use the vertical movement of the water and, consequently, to have available a large amount of power.

In all wave motors of which I am aware, intended to utilize the vertical wave movements, there is no provision for the change of water level beyond the provision of certain parts of great length in the machine. Thus, the vertical motion is habitually transferred from the float to the mechanism located above through the medium of a long rack or cable, etc. A shaft is usually rotated from the cable. The normal wave induced stroke of the float may be, say three feet, while tidally produced differences in position may be as much as ten or twelve feet. The mechanism which utilizes the energy of the revolving shaft must be capable of receiving and transmitting its energy at widely varying rotative positions, say through a compass of a dozen revolutions.

It is the prime object of my invention to provide a simple and compact mechanism for taking the power from the rack, or from the rotating shaft actuated thereby, and applying it to a pump or other mechanism, utilizing the full power stroke of the float in any position. The pump or other power utilizing mechanism may be of any character adapted to receive a reciprocating motion. If a pump, it may be either single or double acting, just as the arrangement of the float mechanism may require. Thus, with a float of given weight, say half the weight of the same volume of water, a double acting pump may be desired so as to utilize the energy of both the downward and upward motions; while, with a very light float, only the upward motion might be utilized.

In the accompanying drawings: Figure 1 is a sectional elevation of my improved device. Fig. 2 is an enlarged section taken on line 2—2 of Fig. 1. Fig. 3 is an enlarged section taken on line 3—3 of Fig. 1.

In the drawings 5 designates piles supporting a floor 6 of a pier or wharf of ordinary construction. Between piles 5 a float 4 of any preferred construction is adapted to float on the surface of the water 7 and to be moved vertically by the action of the waves thereon. The float is provided with rollers 8 which bear against the piles thereby forming anti-friction means for guiding the float in a true vertical reciprocation. Attached to float 4 is a gear rack 9, preferably provided with teeth 10 on both its edges. This rack may be made of one solid piece or it may be made of a beam having the rack teeth secured to both edges; the particulars of construction having no bearing on the general result.

Mounted on the wharf floor in bearings 11 are two shafts 12. These shafts carry gears 13 rigidly affixed thereto, the gears meshing with teeth 10 of rack 9. When float 4 is reciprocated vertically by the action of the waves, shafts 12 are rotated in opposite directions, the amount of rotation depending upon the stroke of rack 9. Rack 9 is made sufficiently long to remain in engagement with gears 13 throughout the motion of the float due to tides. Thus, when the tide is low, the rack will engage its upper position with the gears, and when the tide is high the lower portion will be engaged.

Mounted on shafts 12 are two gears 15, these gears rotating with the shafts and with gears 13. Between gears 15 is a double faced rack 16 having teeth 17 engaging with the teeth of both gears. This rack is only long enough to accommodate the back and forth rotation of gears 15 for the wave motion at one mean water level. At the ends of rack 16 are mounted small rotatable gears 18, these gears being so located that their teeth form continuations of teeth 17. Lower gears 18 are free to revolve in either direction, while upper gears 18 are constrained by pawls 19 from rotating in the direction indicated by the arrows. While rack 16 is reciprocated so that gears 18 on either end come into engagement with gears 15, it will be seen that any further rotation of gears 15 will merely rotate gears 18 without tending to further reciprocate the rack. In the mechanism shown, the weight of the rack is supposed to be sufficient to start the rack downwardly to place the rack teeth again in engagement with gears 15 after gears 15 have been in engagement with lower gears 18. When gears 15 have engaged upper gears 18 and have rotated them in the direction opposite to that indicated by the arrows, and when gears 15 begin to revolve in the opposite direction, gears 18 are then held stationary by pawls 19, so that the effect of the rotation of gears 15 is to force the rack 16 upwardly so that gears 15 may again engage with teeth 17. The pawls could be applied to lower gears 18 as well as to the upper gears. It will be seen that rack 16 is thus adjusted to any mean position of the float. The action of gears 18 allows it to remain always in such a position as to receive a full reciprocation no matter where the tide level may be.

I have shown rack 16 attached to pump rod 20 which operates a pump 21 for pumping water through pipe 22 to any suitable reservoir for storage purposes. The power thus stored may be used in any desired manner; the water may be used for fire or domestic use or for any other utility to which water under pressure may be applied—my invention is not limited by these features.

It will be understood that my device may be multiplied as much as desired, a number of floats being attached to a single wharf. Other minor changes may be made in the mechanism without departing from the scope and spirit of my invention, the controlling feature being the mechanism particularly shown in Fig. 3. The arrangement of parts, the proportions of the various mechanisms, and the positions of the various racks, etc., may be altered. It will be understood that the racks need not both be vertical, the pump rack being sometimes placed advantageously in a horizontal position.

Having described my invention, I claim:

1. In a device of the class described, a rotating gear, a rack in engagement with the gear and adapted to be moved longitudinally by the rotation thereof, and a gear rotatably mounted on the rack at the end thereof, the teeth of the rotatable gear forming a continuation of the rack teeth.

2. In a device of the class described, a rotating gear, a rack in engagement with the rotating gear and adapted to be moved longitudinally by the rotation thereof, gears rotatably mounted on the rack at the ends thereof, the teeth of said gears forming continuations of the rack teeth, and means to prevent the rotation of one of the last named gears in one direction.

3. In a device of the class described, a rotating gear, a rack in engagement with the rotating gear and adapted to be moved longitudinally by the rotation thereof, gears rotatably mounted on the rack at the ends thereof, the teeth of the gears forming continuations of the said rack, and a pawl engaging one of the gears to prevent its rotation in one direction.

4. In a device of the class described, an oscillating gear, a vertical rack in engagement with the gear and adapted to be moved vertically by the oscillation thereof, a gear rotatably mounted on each end of the rack in such a position that their teeth form continuations of the rack teeth at its upper and lower ends, and a pawl engaging the upper one of said gears to prevent its rotation in a direction to move its teeth away from the rack teeth but allowing rotation in the opposite direction.

In witness that I claim the foregoing I have hereunto subscribed my name this 24th day of October 1910.

ALEXANDER DEAN.

Witnesses:
ELWOOD H. BARKELEW,
THOMAS L. O'BRIEN.

Copies of this patent may be obtained for five cents each, by addressing the "Commissioner of Patents, Washington, D. C."